United States Patent [19]
Wada et al.

[11] Patent Number: 5,977,934
[45] Date of Patent: *Nov. 2, 1999

[54] INFORMATION PROCESSING APPARATUS

[75] Inventors: Hiroshi Wada, Fujisawa; Yoshiaki Nomura, Kawasaki; Yasushi Yamakawa, Owariasahi, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/726,690

[22] Filed: Oct. 7, 1996

[30] Foreign Application Priority Data

Oct. 19, 1995 [JP] Japan ................................. 7-271062

[51] Int. Cl.⁶ .................................................. G09G 5/00
[52] U.S. Cl. ................................................. 345/3; 345/1
[58] Field of Search ................................. 345/1, 3, 11

[56] References Cited

U.S. PATENT DOCUMENTS

| | | | |
|---|---|---|---|
| 4,926,166 | 5/1990 | Fujisawa et al. | 345/3 |
| 5,038,301 | 8/1991 | Thome, III | 345/3 |
| 5,430,457 | 7/1995 | Zenda | 345/3 |
| 5,495,263 | 2/1996 | Dalton et al. | 345/3 |
| 5,506,602 | 4/1996 | Yokoyama | 345/11 |
| 5,546,098 | 8/1996 | Moriconi | 345/3 |
| 5,579,025 | 11/1996 | Itoh | 345/3 |

OTHER PUBLICATIONS

6420 Wingine IC incorporated in Chips & Technologies, Feb. 1992.
IBM Technical Disclosure Bulletin vol. 33, No. 2, Jul. 1990.

*Primary Examiner*—Bipin H. Shalwala
*Assistant Examiner*—Ricardo Osorio
*Attorney, Agent, or Firm*—Antonelli, Terry, Stout & Kraus, LLP

[57] ABSTRACT

An information processing apparatus for outputting a display signal to a display device includes a memory unit for storing a plurality of display specification setting instructions for specifying display specifications of a plurality of display devices having different specifications form each other, an instruction execution unit for reading one of the display specification setting instructions from the memory unit in response to an identification signal to execute the display specification setting instruction and a display controller for outputting the display signal in accordance with the display specification of the display specification setting instruction. The display signal in accordance with the display specification of the display device is inputted to the display device.

10 Claims, 16 Drawing Sheets

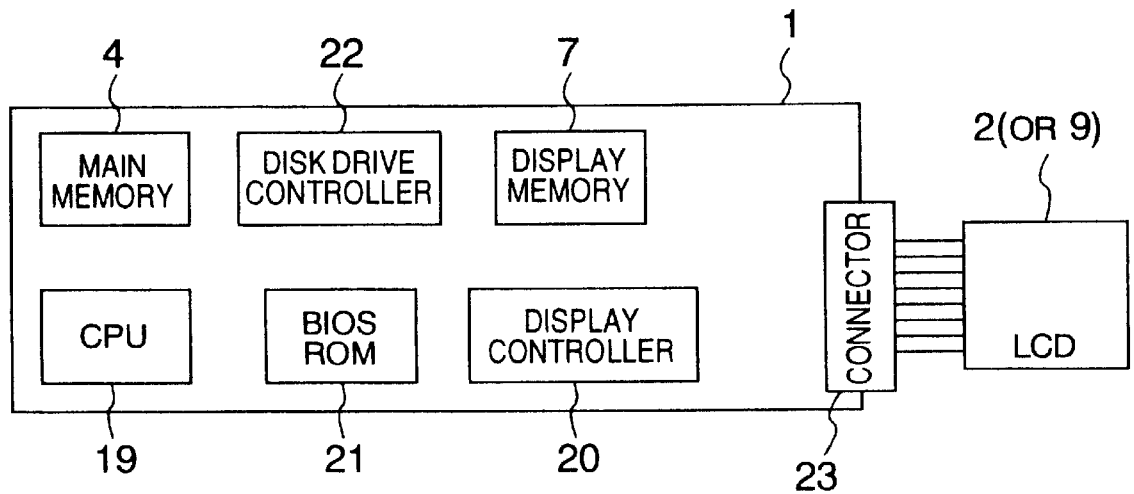
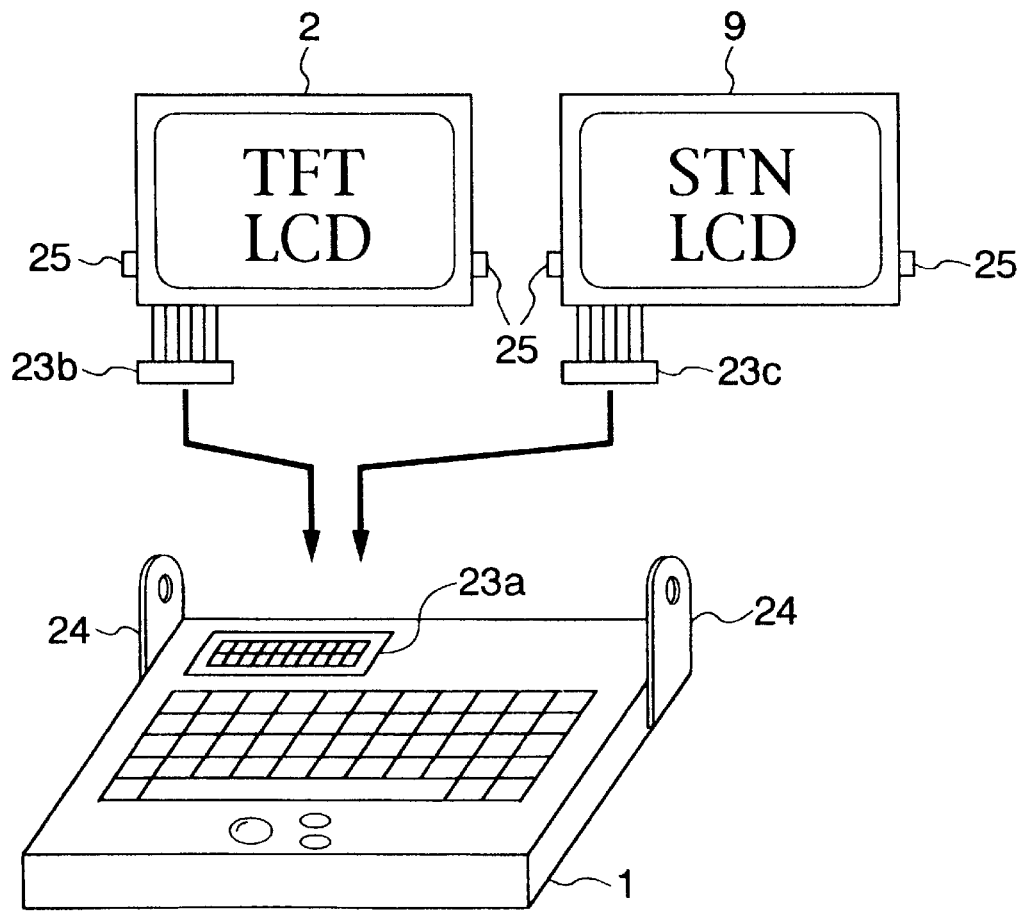

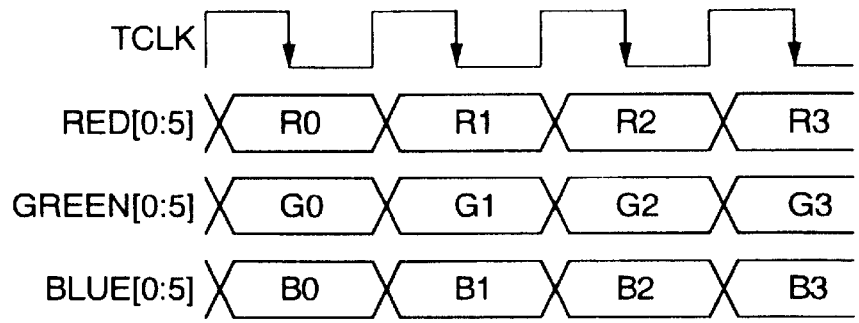
FIG.9A
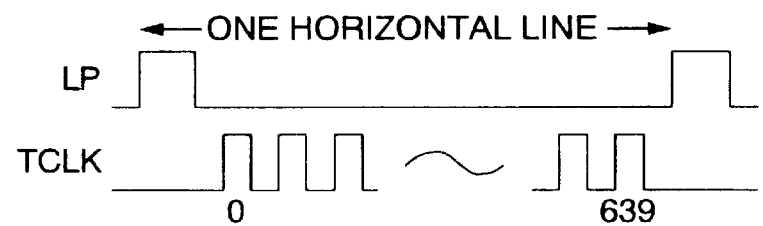
FIG.9B
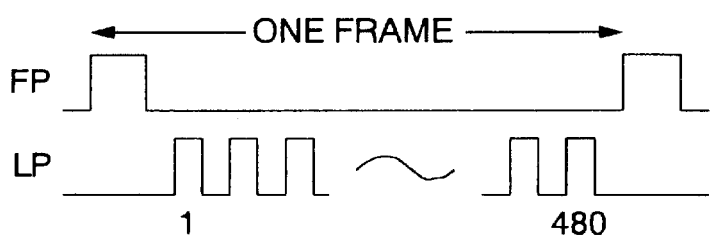
FIG.9C
FIG.10
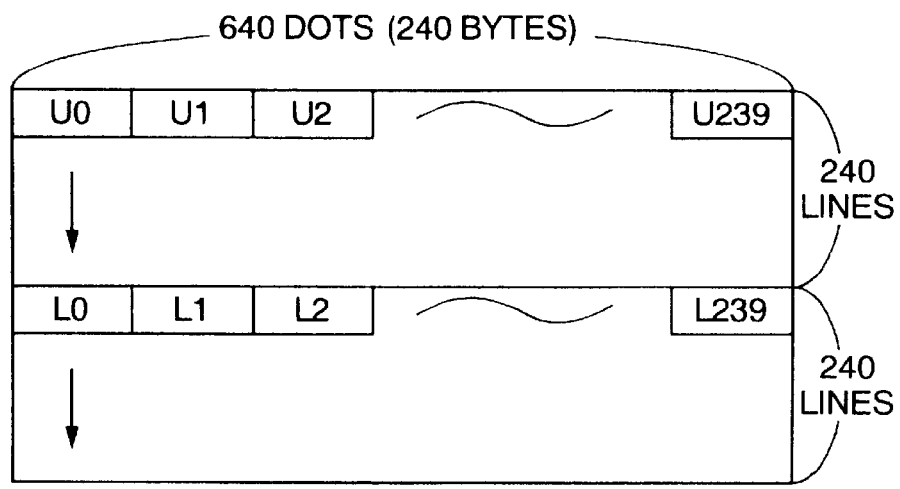

FIG.11
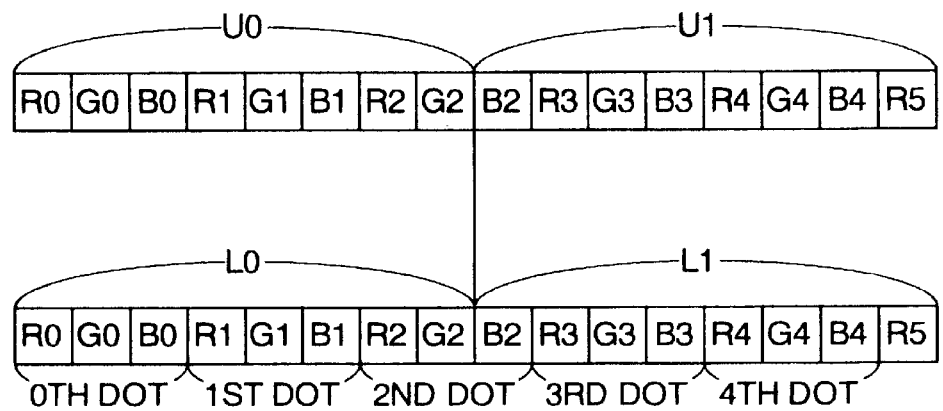
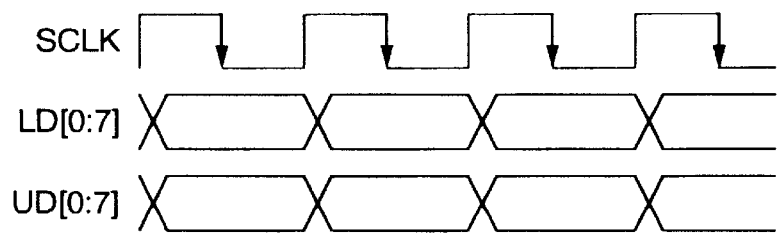
FIG.12A
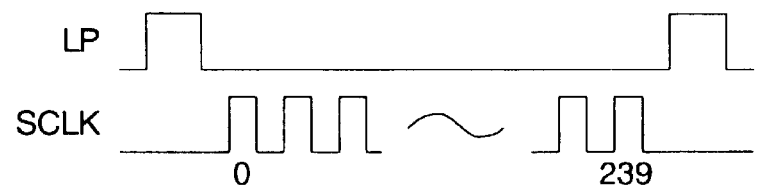
FIG.12B
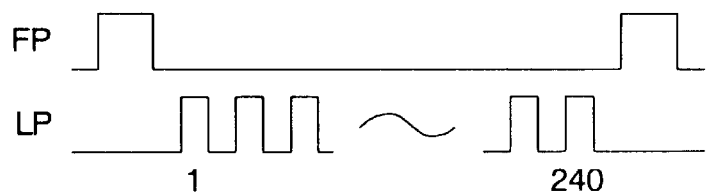
FIG.12C

FIG.19
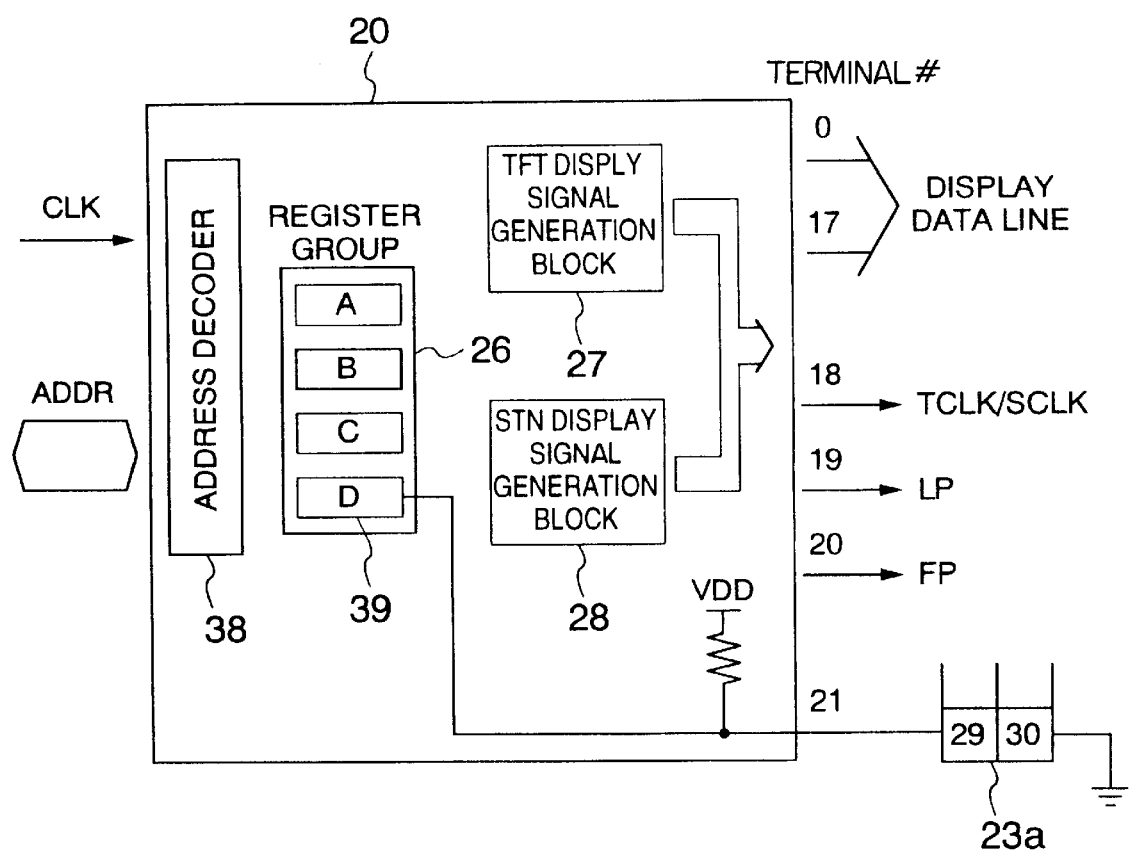
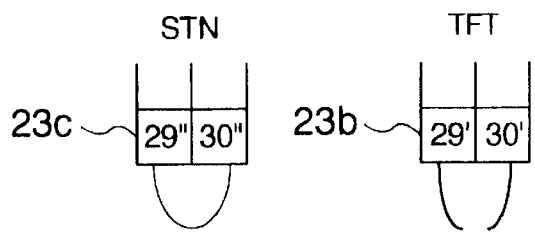

INFORMATION PROCESSING APPARATUS

BACKGROUND OF THE INVENTION

The present invention relates to an information processing apparatus such as a small size information equipment, for example, a notebook computer.

As a display for a notebook computer, a TFT (Thin Film Transistor) type liquid crystal display device (TFT liquid crystal panel) which provides a high display quality but is expensive and an STN (Super Twisted Nematic) type liquid crystal display device (STN liquid crystal panel) which is inexpensive but exhibit high flicker are frequently used. In Japanese Patent Application laid-open No. JP-A-1-277890, an information processing apparatus is constructed by using a dual scan type STN type liquid crystal display device, and in JP-A5-249928, an information processing apparatus is constructed by using the TFT type liquid crystal display device.

FIG. 25 shows a schematic configuration of a conventional personal computer. As shown, a TFT type liquid crystal display device 2 is connected to a personal computer main unit 1 which includes a CPU (central processing unit) 3, a main memory 4, a BIOS (Basic Input/Output System) ROM 5 which stores display specification setting instructions for the TFT type liquid crystal display device 2, a display controller 6, a display memory 7, and a connector device 8 for connecting the personal computer main unit 1 and the TFT type liquid crystal display device 2. The CPU 3, the BIOS ROM 5 and the display controller 6 are arranged on a main board (not shown). The display specification means information on a display system such as a display screen size (the numbers of horizontal and vertical dots), the number of colors and a clock frequency.

FIG. 26 shows a schematic configuration of another prior art personal computer. As shown, an STN type display device 9 is connected to a personal computer main unit 9 which comprises a CPU 3, a main memory 4, a BIOS ROM 10 which stores display specification setting instructions for the STN type liquid crystal display device 9, a display controller 6, a display memory 7 and a connector device 11 for connecting the personal computer main unit 1 and the STN type liquid crystal display device. The CPU 3, the BIOS ROM 10 and the display controller 6 are arranged on a main board (not shown).

In those personal computers, since the display systems of the TFT type liquid crystal display device 2 and the STN type liquid crystal display device 9 are different from each other, the BIOS ROMs 5 and 10 for storing the display specification setting instructions must be provided for each of the display systems. Accordingly, since the main boards for the liquid crystal display device cannot be fully identical, it is not permitted to connect the TFT type liquid crystal display device 2 and the STN type liquid crystal display device to one personal computer main unit 1.

As a result, when a user who has purchased a personal computer which uses the inexpensive STN type liquid crystal display device 9 for economic reasons, desires to change the display device to the high quality TFT type liquid crystal display device 2 because of the flicker problem, he must newly purchase a personal computer which uses the TFT type liquid crystal display device. Further, since a dedicated main board for the liquid crystal device must be prepared for each type of the TFT type liquid crystal display device 2 and the STN type liquid crystal display device 9, it is difficult to promote the sharing of the components used and the manufacturing cost increases. Further, when the personal computers are assembled, the main boards for the two types of liquid crystal display devices must be selected, which takes manpower and time. Recently, application software which handle motion pictures and natural pictures have been becoming popular but since the exchange of only the display device is not permitted, the user must be patient with the STN type liquid crystal display device which exhibits a high flicker and poor image quality or must newly purchase a personal computer which uses the TFT type liquid crystal display device 2. In this case, even if the CPU 3, the main memory 4 and the hard disk do not involve any problems, the user must purchase unnecessary parts.

For an attachment device as shown in FIG. 27 which comprises a bus for exchanging information with the microcomputers 14, and 15 and the personal computer main unit 1 such as a keyboard 12 or a mouse 13, the personal computer main unit 1 can identify the type of the device at the system boot-up, but for the device such as the display device which has no means for conveying information to the personal computer main unit 1, it is not possible to identify the type.

SUMMARY OF THE INVENTION

It is an object of the present invention to provide an information processing apparatus which permits the connection of any one of a plurality of types of display devices to a common information processing apparatus main unit.

In accordance with the present invention, the information processing apparatus which permits the automatic identification of the type of the display device connected to the information processing apparatus main unit is provided.

The information processing apparatus of the present invention includes a memory unit for storing a plurality of display specification setting instructions for specifying the display specifications of a plurality of display devices having different specifications from each other, an instruction execution unit for reading one of the display specification setting instructions from the memory unit in response to an identification signal and executing the display specification setting instruction and a display controller for outputting a display signal in accordance with the display specification of the display specification instruction. The display signal in accordance with the display specification of the display device is inputted to the display device.

In accordance with an embodiment of the present invention, the information processing apparatus main unit and the display device are coupled through a coupling device such as a connector. One or both of the information processing apparatus main unit and the coupling device is provided with an identification signal generation unit for generating the identification signal for specifying the display specification coupled to the main unit. The information processing unit main unit is provided with a control unit which executes the display specification setting instruction based on the identification signal.

BRIEF DESCRIPTION OF THE DRAWINGS

FIG. 1 shows a schematic configuration of a personal computer in accordance with the present invention, FIG. 2 shows a schematic perspective view of the personal computer shown in FIG. 1, FIGS. 9A, 9B and 9C illustrate a method for generating a display signal of a display controller, FIG. 10 shows a screen format of an STN type liquid crystal display device, FIG. 11 illustrates a display signal of the STN type liquid crystal display device, FIGS. 12A, 12B and 12C illustrate a method for generating a display signal of the display controller, FIG. 19 shows a configuration of a portion of other personal computer in accordance with the present invention.

DESCRIPTION OF THE PREFERRED EMBODIMENTS

Figure 3:
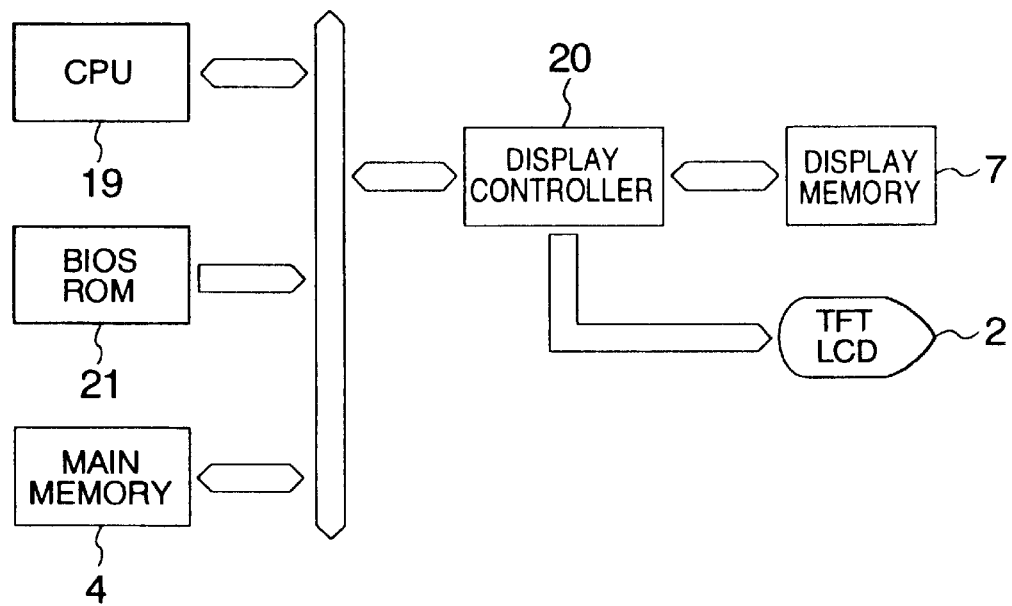
FIG. 3 shows a schematic block diagram of the personal computer shown in FIG. 1.
Figure 4:
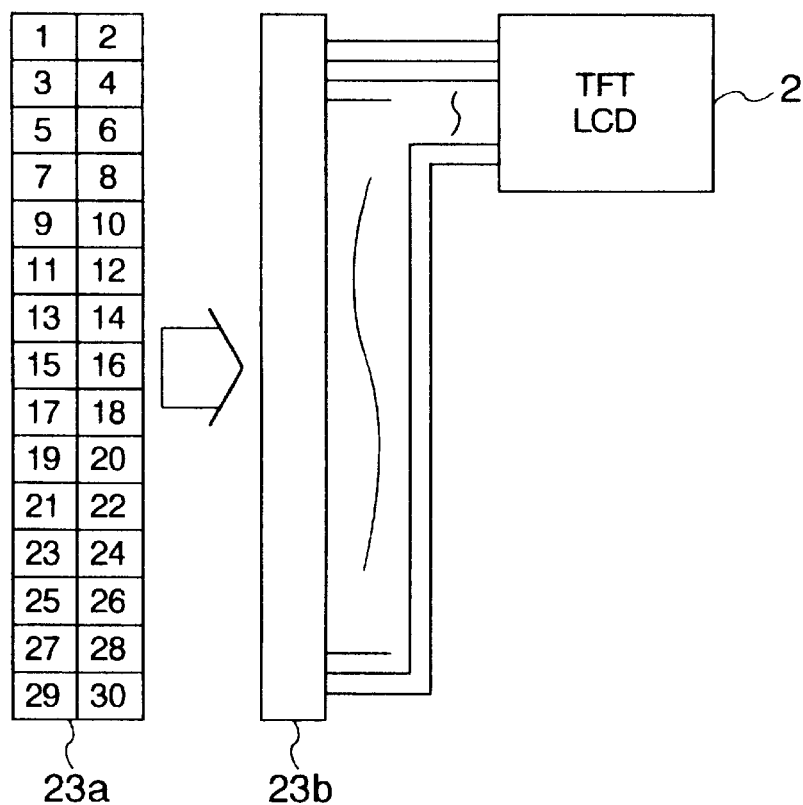
FIG. 4 shows a configuration of a portion of the personal computer shown in FIG. 1.
Figure 5:
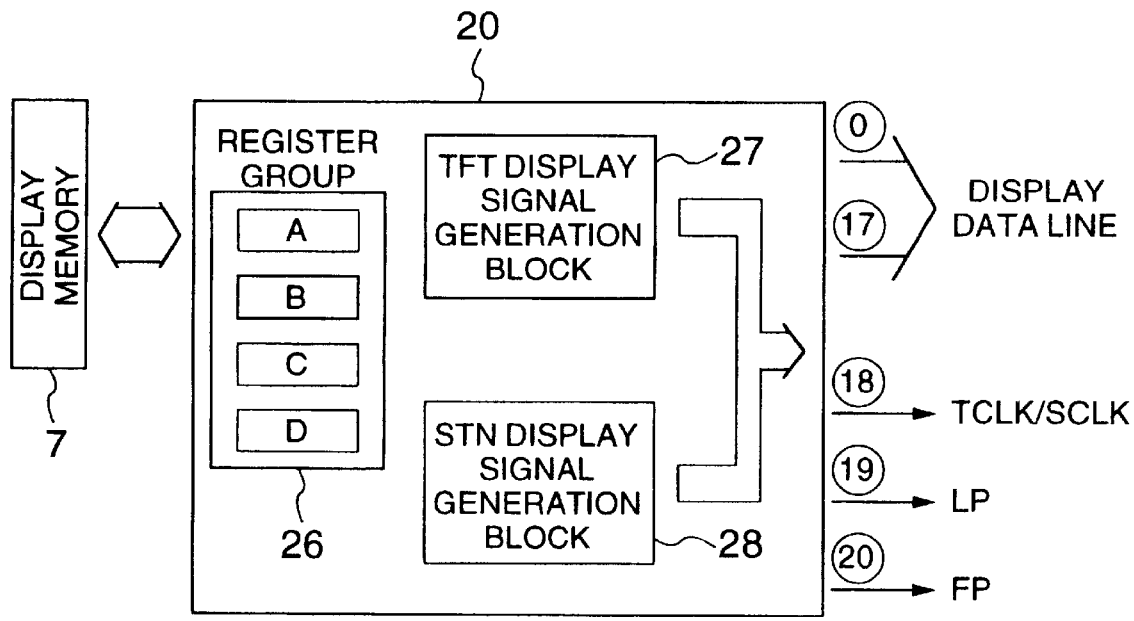
FIG. 5 shows a configuration of a portion of the personal computer shown in FIG. 1.
Figure 6:
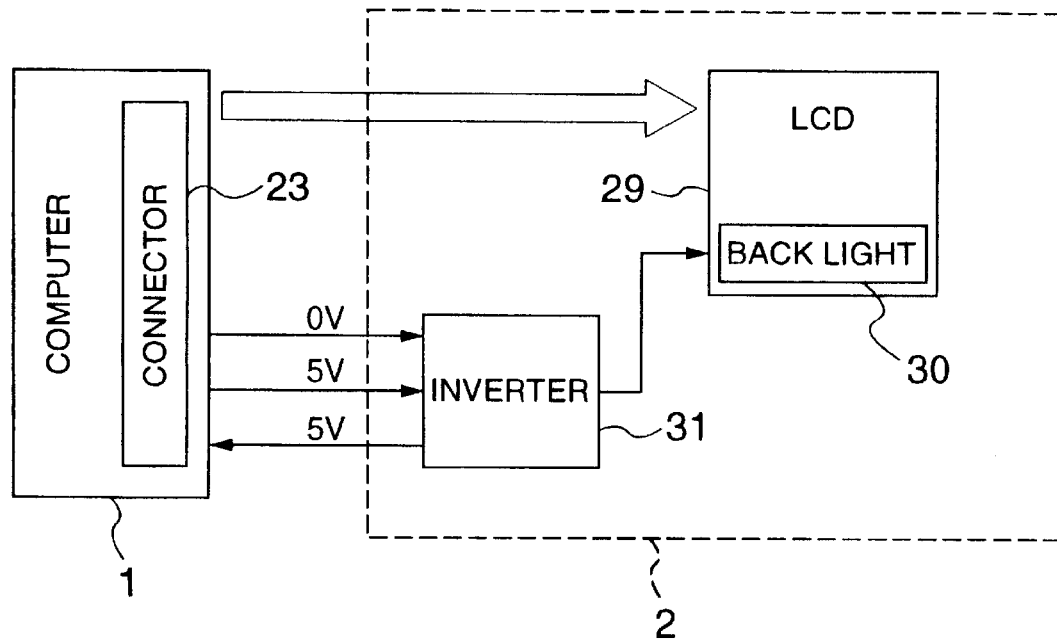
FIG. 6 shows a configuration of a portion of the personal computer shown in FIG. 1.
Figure 7:
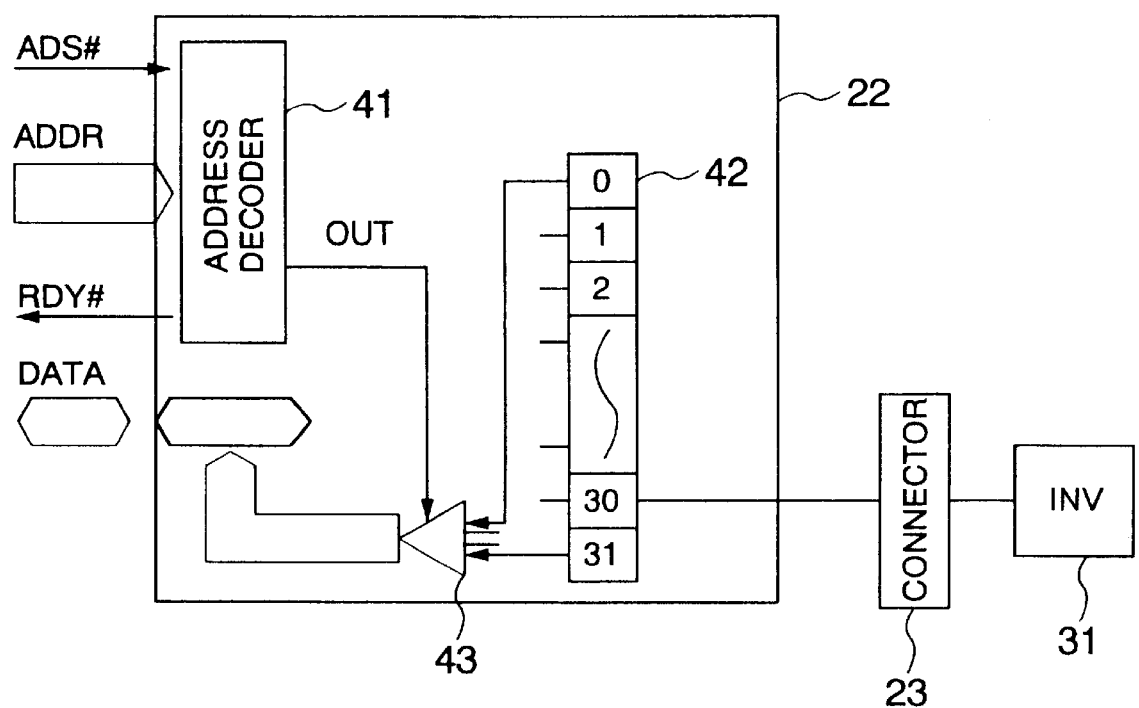
FIG. 7 shows a configuration of a portion of the personal computer shown in FIG. 1.

FIG. 1 shows a schematic configuration of a personal computer in accordance with the present invention. FIG. 2 shows a schematic perspective view of the personal computer shown in FIG. 1. FIG. 3 shows a schematic block diagram of the personal computer shown in FIG. 1. FIG. 4 shows a configuration of a portion of the personal computer shown in FIG. 1. FIG. 5 shows a configuration of a portion of the personal computer shown in FIG. 1. FIG. 6 shows a configuration of a portion of the personal computer shown in FIG. 1. FIG. 7 shows a configuration of a portion of the personal computer shown in FIG. 1. As shown in FIG. 2, a personal computer main unit 1 is provided with a main unit connector 23a and the STN type liquid crystal display device 9 is provided with a display device connector 23c connectable with the main unit connector 23a, and the main unit connector 23a and the display device connector 23b or 23c constitute a male-female terminal connector device 23. As shown in FIG. 4, when the main unit connector 23a and connector 23 b of the TFT type liquid crystal display device 2 (or the connector 23c of the STN type liquid crystal display device 9) are connected, connection pins #1~#30 of the main unit connector 23a and connection pins #1'~#30' (or #1"~#30"1) of the display device connector 23b (or 23c) are connected. The main unit 1 is provided with a BIOS ROM 21 which is an instruction storage unit for storing display specification setting instructions for the TFT type liquid crystal display device when the TFT type liquid crystal display device 2 is used and display specification setting instruction for the STN type liquid crystal display device when the STN type liquid crystal display device 9 is used, a CPU 19 which is instruction execution means for selectively reading the TFT type liquid crystal display device display specification setting instruction or the STN type liquid crystal display device display specification setting instruction and executing it, and a display controller 20 for outputting a display signal to the main unit connector 23a in accordance with the TFT type liquid crystal display device display specification setting instruction or the STN type liquid crystal display device display specification setting instruction. Connection terminals #0~#20 of the display controller 20 are connected to connection pins #1~#21 of the main unit connector 23a. The CPU 19, the BIOS ROM 21 and the display controller are arranged on a main board (not shown). The personal computer main unit 1 is provided with a main unit attachment device 24 and the TFT type liquid crystal display device 2 and the STN type liquid crystal display device 9 are provided with display device attachment devices 25 connectable to the main unit attachment device 24. As shown in FIG. 5, the display controller 20 is provided with a group of registers 26, A TFT display signal generation block 27 and an STN display signal generating block 28. As shown in FIG. 6, the TFT type liquid crystal display device 2 is provided with a display device main unit 29. The display device main unit 29 is provided with a back light 30 to which an inverter 31 which is a DC power supply is connected. The inverter 31 is connected to the display device connector 23b. In order to turn on the back light 30, it is usually required to supply a voltage of 20V or higher. Since no components in the personal computer main unit 1 uses the voltage of 20V or higher, +5V is supplied from the personal computer main unit 1 to the inverter 31 which converts +5V to +20V and supplies it to the back light 30. The inverter 31 for the TFT type liquid crystal display device 2 also outputs a voltage signal of +5V indicating the TFT type liquid crystal display device and an inverter (not shown) for the STN type liquid crystal display device 9 outputs a voltage signal of 0V indicating the STN type liquid crystal display device. The personal computer main unit 1 is provided with a controller 22 such as a disk drive controller as shown in FIG. 7. The controller 22 is provided with an address decoder 41 and a register 42, a tri-state buffer 43. The 30th bit of the register 42 is connected to the output of the inverter 31 via the connector device 23. By reading the 30th bit of the register, whether the inverter output voltage of the connected display device is low (0V) or high (5V) can be identified.

Figure 8:
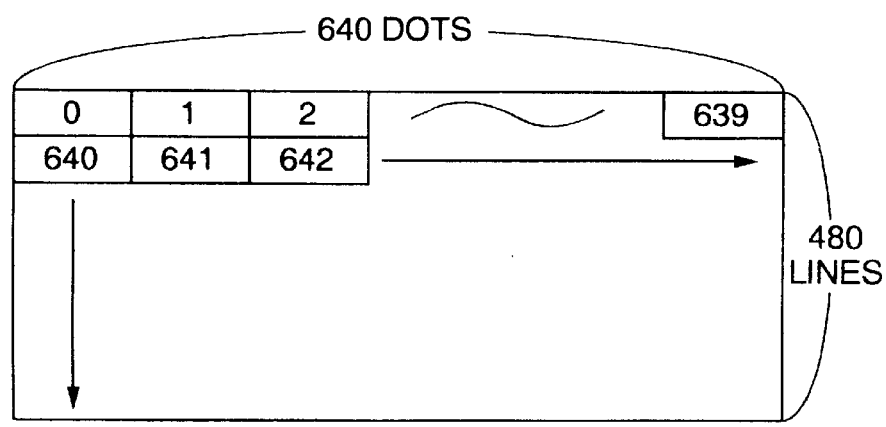
FIG. 8 shows a screen format of a TFT type liquid crystal display device.

FIG. 8 shows a screen format of one frame of the TFT type liquid crystal display device 2. As shown, the TFT type liquid crystal display device 2 comprises 640 dots horizontally and 480 lines vertically. From an origin point at a top left of the screen toward horizontally right, dots 0, 1, 2, 3, ..., 639 are arranged and the dot 640 is at a left end of a lower line. Namely, 640 dots constitute one horizontal line and when one horizontal line is scanned, the lower line is scanned from the left end. When 480 lines are scanned, the scan is repeated again from the left end of the top line. Accordingly, a method for generating the display signal of the display controller 20 is that shown in FIGS. 9A, 9B and 9C. The TFT display signal generation block 27 (FIG. 5) of the display controller 20 outputs six types of signals, a dot clock signal TCLK, dot intensity signals RED [0:5], GREEN [0:5] and BLUE [0:5], a line pulse signal LP and a frame pulse signal FP, where [0:5] means that the signal comprises six bits, bit 0–bit 5. Namely, the dot intensity signal is expressed by 25 contrasts. One dot of the screen is represented by 18 (3×6 bits) signals, the dot intensity signals RED [0:5], GREEN [0:5]and BLUE [0:5]. The intensity of red is determined by the value of the six bits of the dot intensity signal RED [0:5], the intensity of green is determined by the value of the six bits of the dot intensity signal GREEN [0:5] and the intensity of blue is determined by the value of the six bits of the dot intensity signal BLUE [0:5], and the display color of the dot is determined by the intensities of red, green and blue. The dot 0 in FIG. 8 is represented by the value of R0, G0 and B0. As shown in FIG. 9A, the TFT type liquid crystal display device 2 reads the values of the dot intensity signals RED [0:5], GREEN [0:5] and BLUE [0:5] at the fall of the dot clock TCLK to display a color corresponding to the values. As shown in FIG. 9B, the TFT type liquid crystal display device 2 determines the end of scan of one horizontal line at the rise of the line pulse signal LP to start the scan of a lower line, and during two rises of the line pulse signal LP, 640 bits of dot intensity signals RED [0:5], GREEN [0:5] and BLUE [0:5] are generated. As shown in FIG. 9C, the TFT type liquid crystal display device 2 determines the end of scan of one screen at the rise of the frame pulse signal FP to start the scan of the next screen. During two rises of the frame pulse signal FP, 480 lines of line pulse signals LP are generated.

FIG. 10 shows a screen format of the STN type liquid crystal display device 9. As shown, the screen is divided into two sub-screens, upper 240 lines and lower 240 lines. The display data are transferred sequentially rightward from the top left (U0, L0) of the two sub-screens and 240 bytes (640 dots) are transferred. The reason for the 240 bytes is that the STN type liquid crystal display device 9 represents one dot by the three bits R, G and B as shown in FIG. 11. Namely, 640×3 (R, G, B)/8=240. The unit of transfer is 16 bits and they are transferred in the order of U0 and L0, U1 and L1, As shown in FIG. 11, the content of U0 and L0 is that U0 comprises R0, G0 and B0 of the dot 0 of the upper sub-panel, R1, GF1 and B1 of the dot 1 and R2 and G2 of the dot 2, and U1 comprises B2 of the dot 2, R3, G3 and B3 of the dot 3, R4, G4 and B4 of the dot 4 and R5 of the dot 5. L0 and L1 comprise R, G and B data from the dot 0 of the lower sub-panel as they are for U0 and U1. Accordingly, the method for generating the display signal of the display controller 20 is that shown in FIGS. 12A–12C. Namely, as shown in FIG. 12A, the STN display signal generation block 28 of the display controller 20 outputs five types of signals, the shift clock signal SCLK, the 8-bit dot display signals LD [0:7] and UD [0:7], the line pulse signal LP and the frame pulse signal FP. The STN type liquid crystal display device 9 reads the dot display signals LD [0:7] and UD [0:7] at the fall of the shift clock signal SCLK and display it at a predetermined position on the screen. As shown in FIG. 12B, the STN type liquid crystal display device 9 determines the end of the display of one horizontal line of each of the sub-panels at the rise of the line pulse signal LP to start the display of a lower line. During two rises of the line pulse signal LP, the shift clock signals SCLK for reading 240 dot display signals LD [0:7] and UD [0:7] are generated. As shown in FIG. 12C, the STN type liquid crystal display device 9 determines the end of the display of one screen at the rise of the frame pulse signal FP to start the display of the next screen. During two rises of the frame pulse signal FP, 240 lines of line pulse signals LP are generated.

Figure 13:
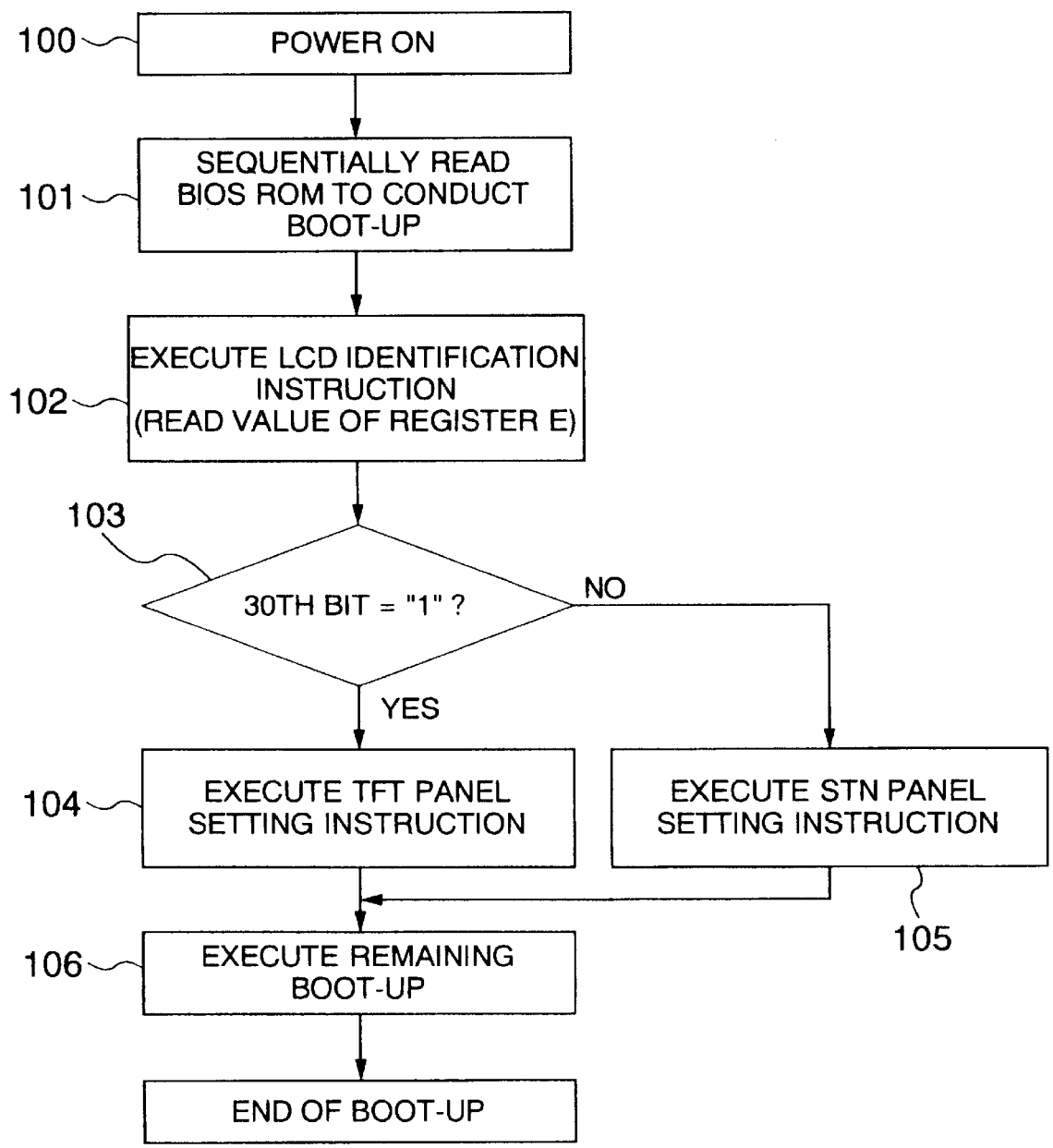
FIG. 13 shows a flow chart for illustrating an operation of the personal computers shown in FIGS. 1 to 7.
Figure 14:
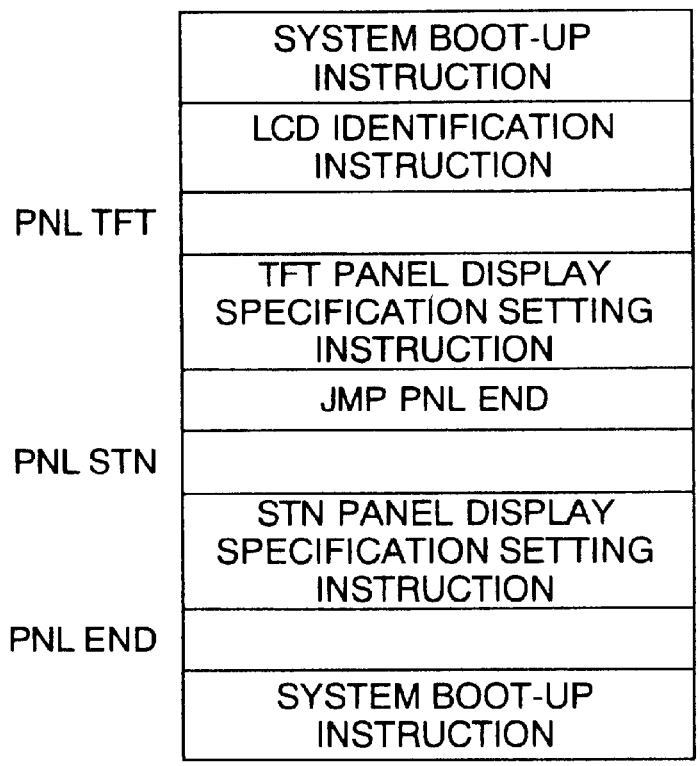
FIG. 14 shows instructions stored in the BIOS ROM.
Figure 15:
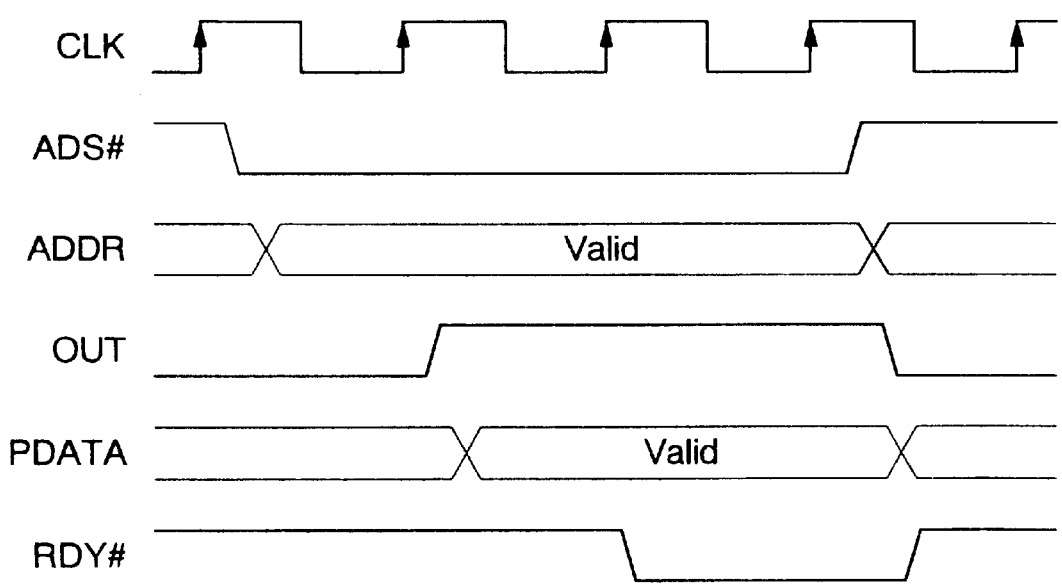
FIG. 15 shows a time chart for an information read operation.

Referring to FIG. 13, an operation of the personal computer shown in FIGS. 1–7 is explained. First, in a step 100, a power is turned on. In a step 101, the instructions stored in the BIOS ROM 21 are sequentially read to conduct the system boot-up. Namely, a system boot-up command to set specifications of peripheral devices such as a floppy disk and a hard disk is executed. Then, in a step 102, an LCD identification instruction to identify the type of the liquid crystal display device (LCD) is executed. Specifically, when the TFT type liquid crystal display device 2 is connected to the personal computer main unit 1, the inverter 31 outputs +5V as the identification signal and the value of the bit 30 of the register 42 of the controller 22 is "1" (high level). On the other hand, when the STN type liquid crystal display device 9 is connected to the personal computer main unit 1, the inverter 31 outputs 0V as the identification signal and the value of the bit 30 of the register 42 is "0" (low level). In the step 102, the CPU 19 reads the value of the bit 30 of the register 42 and in a step 103, it determines the type of the liquid crystal display device connected by checking whether the value is "1" or not. Namely, as shown in FIG. 15, the CPU 19 loads an address effective to specify the bit 30 of the register 42 to an address bus ADR simultaneously with the fall of an address strobe signal ADS#. The address decoder 41 of the controller 22 decodes the address and if the address is identical to the address assigned to the register 42, it activates an out signal OUT. When the out signal OUT is activated, the output of the data bus DATA is simultaneously made effective. The address decoder 41 falls the load signal RDY# to activate it in order to inform to the CPU 19 that the effective data has been loaded on the data bus DATA. After the CPU 19 activates the address strobe signal ADS#, it samples the load signal RDY# from the address decoder 41 and when it confirms that the load signal RDY# has been activated, it reads the bit 30 of the register 42 loaded on the data bus DATA. After the end of the reading, it deactivates the address strobe signal ADS# to make the address ineffective. After the address strobe signal ADS# has been made ineffective, the address decoder 41 deactivates the out signal OUT and the load signal RDY# so that the data bus DATA is made ineffective. In this manner, the CPU 19 can automatically determine the type of the connected liquid crystal display device. If it is determined that the TFT type liquid crystal display device 2 is connected to the personal computer main unit 1, the TFT type liquid crystal display device display specification setting instruction is executed in a step 104. On the other hand, if it is determined that the STN type liquid crystal display device 9 is connected to the personal computer main unit 1, the STN type liquid crystal display device display specification setting instruction is executed in a step 105. Then, in a step 106, the remaining system boot-up instructions are executed. Then, the CPU 19 executes the instructions designated by the user and the application program and during the execution, it store the data to be outputted to the TFT type liquid crystal display device 2 or the STN type liquid crystal display device 9 in the display memory 7 through the display controller 20. The display controller 20 sequentially reads the data stored in the display memory 7 while it coordinates the access by the CPU 19 and generates the display signal to the TFT type liquid crystal display device 2 or the STN type liquid crystal display device 9. Finally, the TFT type liquid crystal display device 2 and the STN type liquid crystal display device 9 displays an image on the display screen in accordance with the display signal from the display controller 20. When the TFT type liquid crystal display device display specification setting instruction is executed by the CPU 19, the TFT display signal generation block 27 generates the dot intensity signals RED [0:5], GREEN [0:5] and BLUE [0:5], the dot clock signal TCLK, the line pulse signal LP and the frame pulse signal FP, and the dot intensity signals RED [0:5], GREEN [0:5] and BLUE [0:5] are outputted from the terminals #0~#17 of the display controller 20 and the dot clock signal TCLK, the line pulse signal LP and the frame pulse signal FP are outputted from the terminals #18~#20. When the STN type liquid crystal display device display specification setting instruction is executed by the CPU 19, the STN display signal generation block 28 generates the dot display signals LD [0:7] and UD [0:7], the shift clock signal SCLK, the line pulse signal LP and the frame pulse signal FP, and the dot display signals LD [0:7] and UD [0:7] are outputted from the terminals #0~#15 of the display controller 20 and the shift clock signal SCLK, the line pulse signal LP and the frame pulse signal FP are outputted from the terminals #18~#20.

In the personal computer shown in FIGS. 1~7, the TFT type liquid crystal display device 2 or the STN type liquid crystal display device 9 may be connected to the common personal computer main unit 1 for display. For example, if the user who has purchased the personal computer which uses the inexpensive STN type liquid crystal display device 9 for an economical reason desires to replace the display device with the TFT type liquid crystal display device 2 having a high image quality by the problem of the flicker of the screen, he may need to purchase only the TFT type liquid crystal display device 2 and does not need to newly purchase the personal computer which uses the TFT type liquid crystal display device 2. Further, since it is not necessary to prepare the dedicated main board for the liquid crystal display device for each of the types adopted by the TFT type liquid crystal display device 2 and the STN type liquid crystal display device 9, it is easy to promote the sharing of the components used and the manufacturing cost is reduced. When the personal computer is assembled, it is not necessary to use two types of main boards for the liquid crystal display device and the manpower and the time are saved. When the user uses application software which handles motion picture or natural picture, it is not necessary to newly purchase the personal computer which uses the TFT type liquid crystal display device 2 if the TFT type liquid crystal display device 2 is connected to the personal computer main unit 1 and the user need not be patient with the STN type liquid crystal display device 9 which has the high flicker and offers the poor image quality. Further, since whether the display device connected to the personal computer main unit 1 is the TFT type liquid crystal display device 2 or the STN type liquid crystal display device 9 can be automatically determined, the manufacturing work and the display device exchange work are facilitated.

In the above embodiment, the inverter 31 of the TFT type liquid crystal display device 2 outputs +5V and the inverter of the STN type liquid crystal display device 9 outputs 0V although they may be reversed. Further, the attachment configuration of the TFT type liquid crystal display device 2 and STN type liquid crystal display device 9 to the personal computer main unit 1 may be other configuration.

Figure 16:
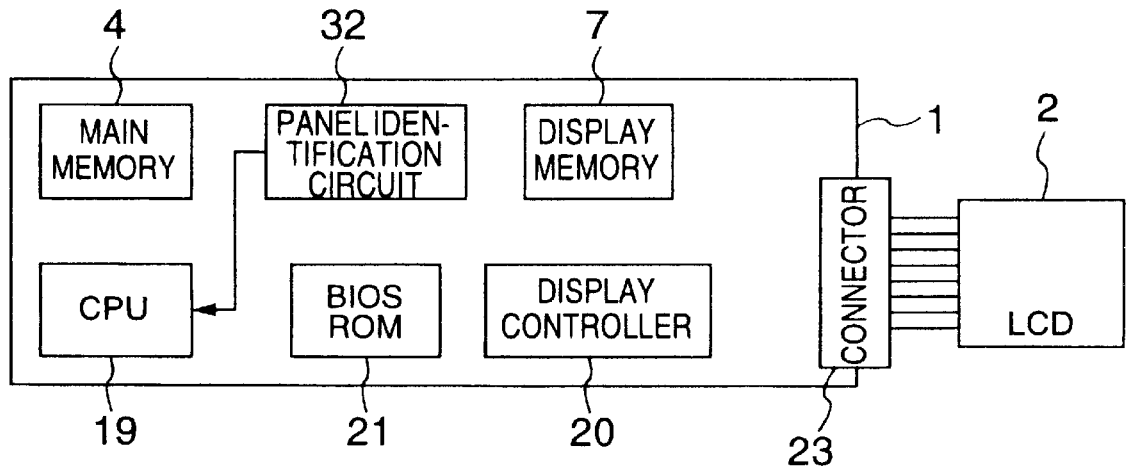
FIG. 16 shows a schematic configuration of another personal computer in accordance with the present invention.

FIG. 16 shows a schematic configuration of another personal computer in accordance with the present invention and FIG. 17 shows a configuration of a portion of the personal computer shown in FIG. 16. As shown in FIG. 16, the personal computer main unit 1 is provided with a panel identification circuit 32 to which one of input/output (I/O) addresses is assigned and which is provided with an address decoder 33 and a tri-state buffer 34. A first pin 35 which is pulled up to the power supply voltage $V_{DD}$ is connected to the tri-state buffer 34 and a second pin 36 is grounded. The pins 35 and 36 are metal conductors vertically extending from the main board of the personal computer main unit 1 and a jumper 37 which allows the connection of the pins 35 and 36 is provided. The pins 35 and 36 and the jumper 37 constitute a display device type identification unit 50.

Figure 17A:
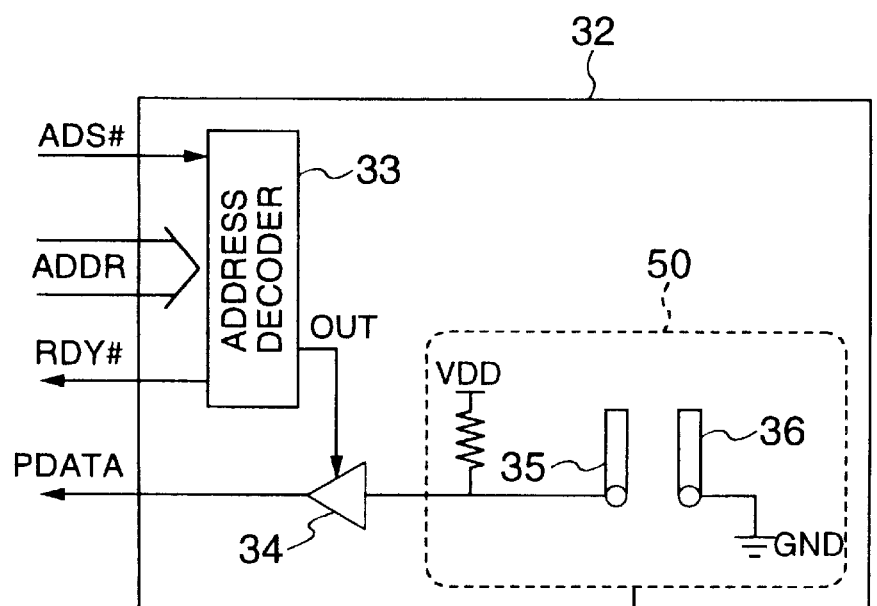
FIGS. 17A and 17B show configurations of portions of the personal computer shown in FIG. 16.
Figure 17B:
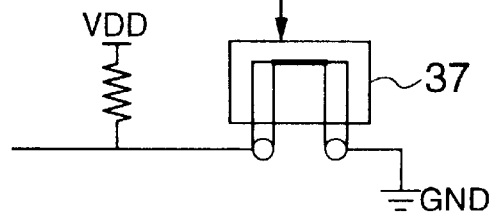

In the present personal computer, as shown in FIG. 17A, when the CPU 19 reads a voltage level of the pin 35 by a time chart similar to that shown in FIG. 15 during the system boot-up while the jumper 37 is removed, the out signal OUT is active and the pulled-up high level is the output of PDATA which is connected to one line of the data bus through the tri-state buffer 34. On the other hand, as shown in FIG. 17B, when the jumper 37 is attached, the grounded low level is the output of PDATA. Namely, the voltage level outputted to the PDATA may be changed by whether the pins 35 and 36 are short-circuited by the jumper 37 or not. Accordingly, when the user uses the TFT type liquid crystal display device 2, he takes off the jumper 37, and when he uses the STN type liquid crystal display device 9, he attaches the jumper 37. The CPU 19 can identify the type of the liquid crystal display device connected to the personal computer main unit 1 by simply reading the voltage level of the pin 35.

In the present embodiment, the jumper 37 is taken off when the TFT type liquid crystal display device 2 is used, and the jumper is attached when the STN type liquid crystal display device 9 is used although they may be reversed. Further, in the present embodiment, the pin 35 is pulled up and the pin 36 is grounded although they may be reversed.

Figure 18:
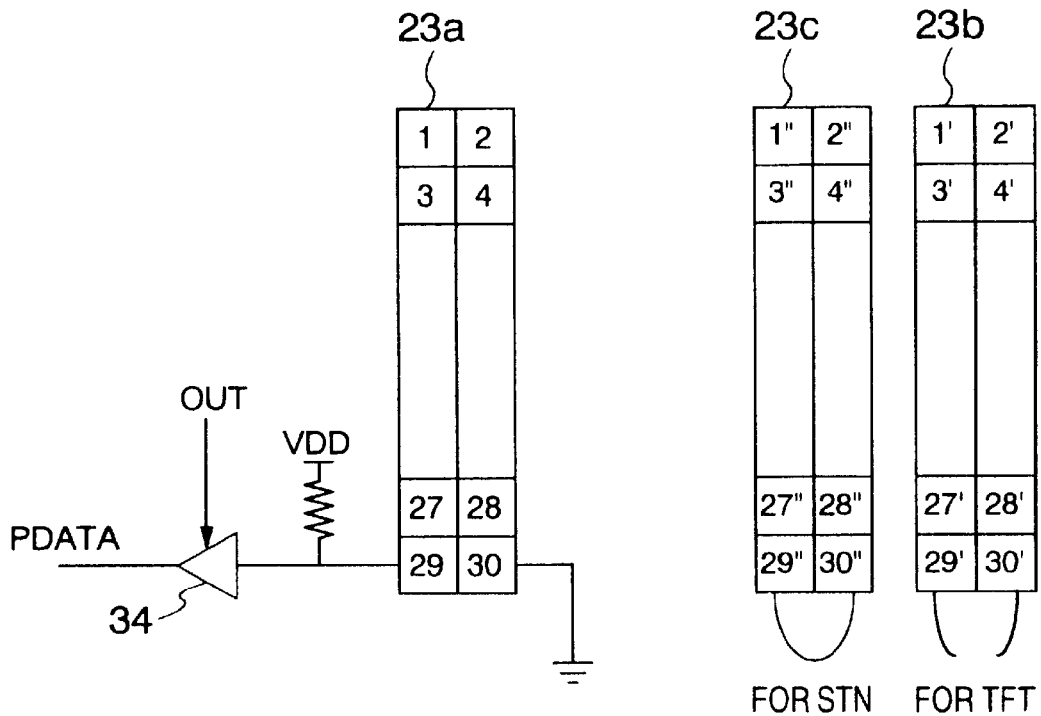
FIG. 18 shows a configuration of a portion of other personal computer in accordance with the present invention.

FIG. 18 shows a configuration of a portion of other personal computer in accordance with the present invention. As shown, a connection pin #29 of the main unit connector 23a is pulled up to the power supply $V_{DD}$ and connected to the tri-state buffer 34, and a connection pin #30 of the main unit connector 23a is grounded. A connection pin #29' which is a first connection pin of the TFT display device connector 23b and a connection pin #30' which is a second connection pin are not connected. A connection pin #29" which is a first connection pin of the STN display device connector 23c and a connection pin #30" which is a second connection pin are connected (short-circuited). The connection pins #29 and #30 of the main unit connector 23a, the connection pins #29' and #30' of the TFT display device connector 23b, and the connection pins #29" and #30" of the STN display device connector 23c constitute a display device type identification unit.

In the present personal computer, when the CPU 19 reads the voltage level of the connection pin #29 of the main unit connector 23a by a time chart similar to that shown in FIG. 15 during the system boot-up while the main unit connector 23a and the display device connector 23b are connected, the out signal OUT is active and the pulled-up high level is the output of PDATA through the tri-state buffer 34. On the other hand, when the main unit connector 23a and the display device connector 23c are connected, the grounded low level is the output of PDATA. Accordingly, the type of the liquid crystal display device connected to the personal computer may be identified.

In the present embodiment, the connection pins #29 and #30 of the display device connector 23*b* are not connected and the connection pins #29 and #30 of the display device connector 23*c* are connected although they may be reversed. Further, in the present embodiment, the connection pin #29 of the main unit connector 23*a* is pulled up to the power supply and the connection pin #30 of the main unit connector 23*a* is grounded although they may be reversed.

Figure 20:
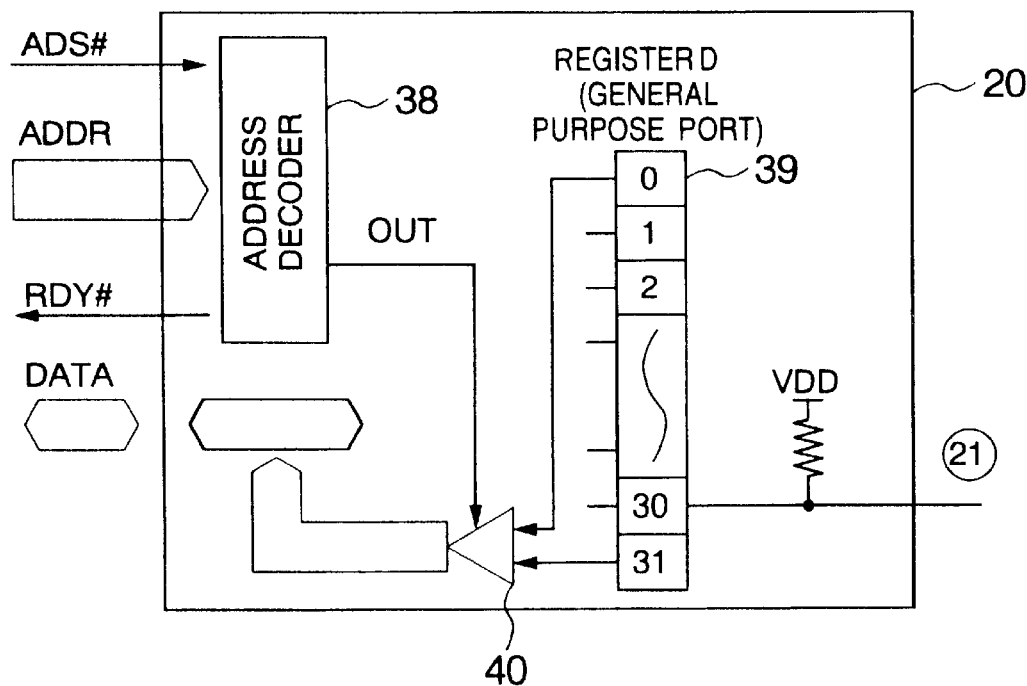
FIG. 20 shows a configuration of a portion of another personal computer in accordance with the present invention.

FIG. 19 shows a configuration of a portion of other personal computer in accordance with the present invention, and FIG. 20 shows a block diagram of a configuration of a display device type identification unit of the personal computer shown in FIG. 19. As shown, the display controller 20 is provided with the address decoder 38 and the register group 39, the connection pin #29 of the main unit connector 23*a* is connected to a terminal #21 of the display controller 20 and pulled up to the power supply, and a terminal #21 of the display controller 20 is connected to a 30th bit of the register 39 of the register group 26.

The CPU 19 reads the value of the register 39 to determine whether it is the low level or the high level. The connection pin #30 of the main unit connector 23*a* is grounded, the connection pins #29' and #30' of the display device connector 23*b* are not connected, and the connection pins 29" and 30" of the display device connector 23*c* are connected. The connection pins #29 and #30 of the main unit connector 23*a*, the connection pins #29' and #30' of the display device connector 23*b*, and the connection pins #29" and #30" of the display device connector 23*c* constitute a display device type identification means.

In the present personal computer, when the main unit connector 23*a* and the display device connector 23*b* are connected, the value of the 30th bit of the register 39 is "1", and when the main unit connector 23*a* and the display device connector 23*c* are connected, the value of the 30th bit of the register 39 is "0". Accordingly, when the CPU 19 reads the value of the 30th bit of the register 39 by a time chart similar to that shown in FIG. 15 during the system boot-up, it can identify the type of the liquid crystal display device connected to the personal computer main unit by whether the value is "1" or not. Since the display device type identification means is connected to the display controller, the system boot-up may be rapidly conducted.

In the present embodiment, the register 39 is a 32-bit register although it may be a register of other width. Further, in the present embodiment, the terminal #21 of the display controller 20 is connected to the 30th bit although other bit may be used. In the present embodiment, the terminal #21 is pulled up in the display controller 20 although it may be pulled up externally. In the present embodiment, the terminal #21 is pulled up and the connection pin #30 of the main unit connector 23*a* is grounded although they may be reversed. Further, in the present embodiment, the terminal #21 is used although other terminal may be used. Further, when the connection pins #29' and #30 of the display device connector 23*b* are short-circuited and the connection pins #29" and #30" of the display device connector 23*c* are opened, the same identification function as that of the present embodiment is attained.

Figure 21:
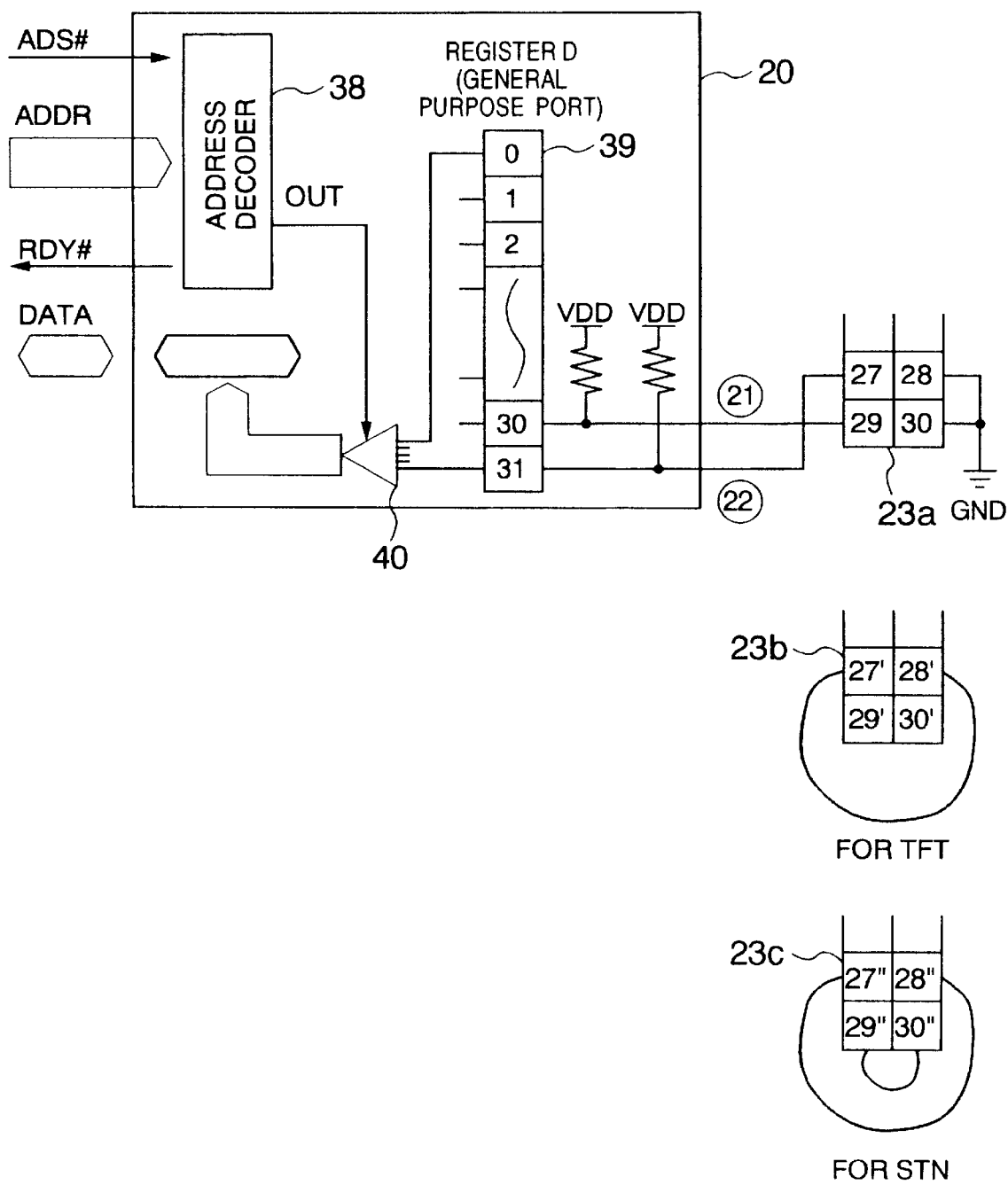
FIG. 21 shows a configuration of a portion of another personal computer in accordance with the present invention.

FIG. 21 shows a configuration of a portion of other personal computer in accordance with the present invention. As shown, a connection pin #27 of the main unit connector 23*a* is connected to a terminal #22 of the display controller 20 and pulled up to the power supply. A terminal #22 of the display controller 20 is connected to a 31st bit of the register 39. A connection pin #28 of the main unit connector 23*a* is grounded. A connection pin #27' which is a third connection pin of the TFT display device connector 23*b* and a connection pin #28' which is a fourth connection pin are connected (short-circuited). Connection pins #29' and #30' are not connected (opened). A connection pin #27" which is a third connection pin of the STN display device connector 23*c* and a connection pin #28" which is a fourth connection pin are connected (short-circuited), and connection pins #29" and #30" are connected (short-circuited). The connection pins #27 and #28 of the main unit connector 23*a*, the connection pins 27', 28', #27" and #28" of the TFT and STN display device connectors 23*b* and 23*c* constitute a display device connection identification unit. An alarm device (not shown) is provided to generate a panel non-connection alarm sound when the display device connection identification unit determines that the display device is not connected to the personal computer main unit 1.

Figure 22:
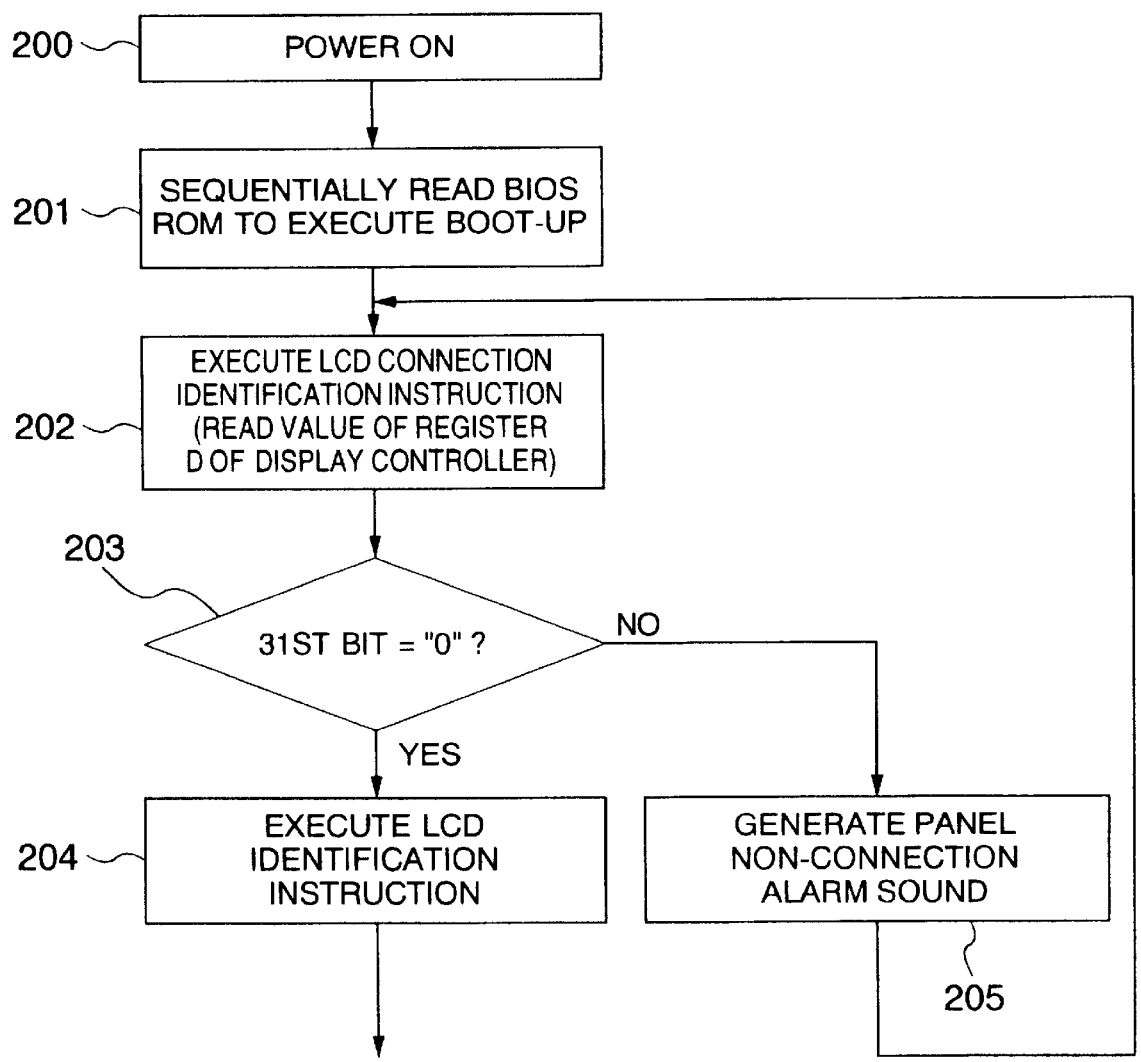
FIG. 22 shows a flow chart for illustrating an operation of the personal computer shown in FIG. 21.
Figure 23:
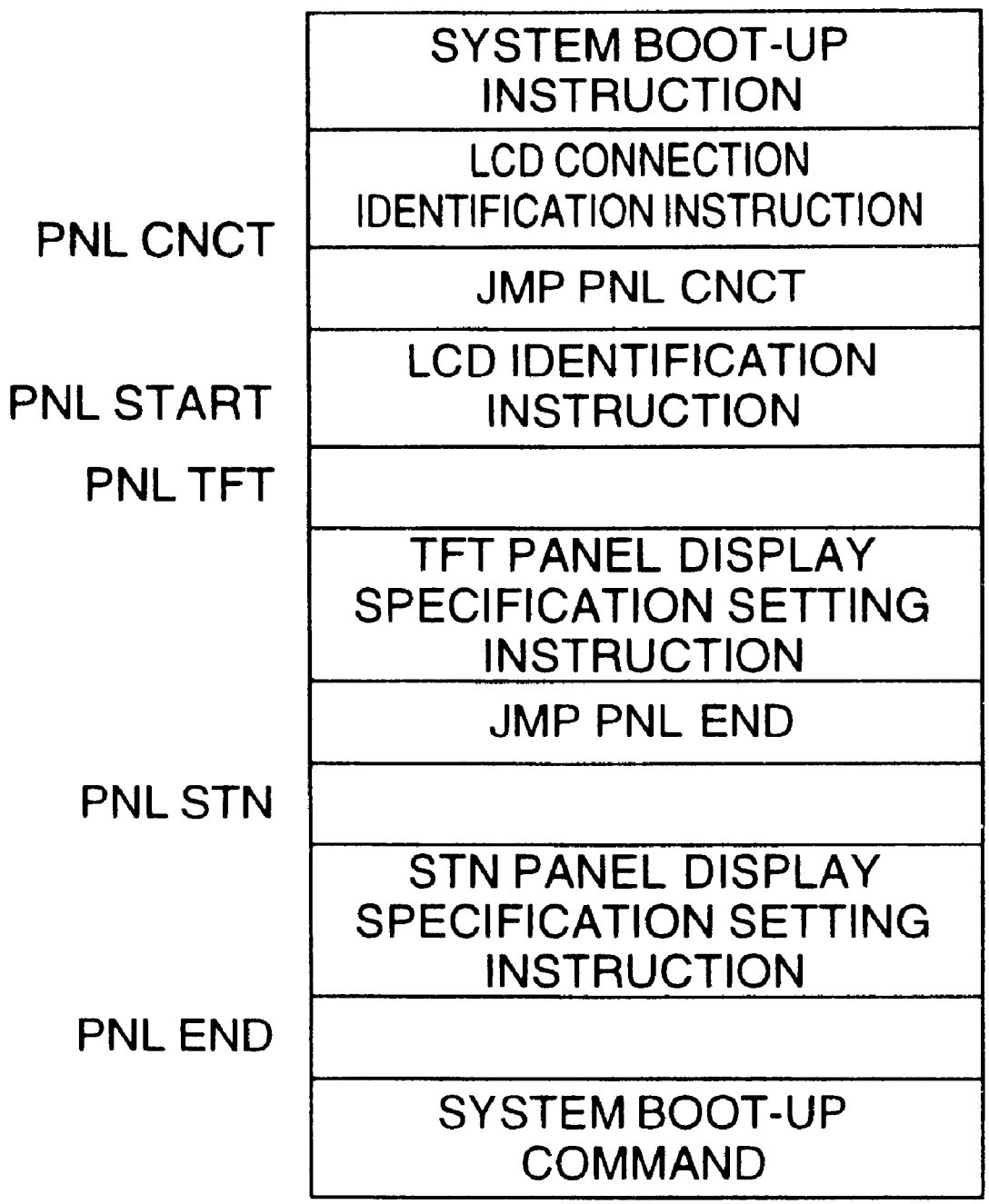
FIG. 23 shows instructions stored in the BIOS ROM.

Referring to an operation flow chart of FIG. 22, an operation of the personal computer of the other embodiment of the present invention shown in FIG. 21 is explained. First, in a step 200, a power is turned on. In a step 201, the CPU 19 sequentially reads the instructions stored in the BIOS ROM 21 shown in FIG. 23 to boot up the system. Namely, a system boot-up instruction for setting specifications of a floppy disk and a hard disk is first executed. Then, an LCD connection identification instruction is executed in a step 202 to determine whether the liquid crystal display device (LCD) is connected or not. When the main unit connector 23*a* and the display device connector 23*b* or 23*c* are securely connected, the value of the 31st bit of the register 39 is "0". On the other hand, when the main unit connector 23*a* and the display connector 23*b* or 23*c* are not connected, the value of the 31st bit of the register 39 is "1". If the CPU 19 reads the value of the 31st bit of the register 39 by the same time chart as that shown in FIG. 15, whether the liquid crystal display device is connected to the personal computer main unit 1 or not may be determined by checking whether the value is "0" or not in a step 203. If it is determined that the liquid crystal display device is not connected to the personal computer main unit 1, the alarm device generates the panel non-connection alarm sound in a step 205 and the LCD connection identification instructions is executed again. On the other hand, if it is determined that the liquid crystal display device is connected to the personal computer main unit 1, an LCD identification instruction to determine the type of the liquid crystal display device is executed in a step 204. Specifically, the 30th bit of the register 39 is read and the type of the liquid crystal display device is determined depending on whether the value is "1" or not. If it is determined that the TFT type liquid crystal display device 2 is connected to the personal computer main unit 1, the TFT type liquid crystal display device display specification setting instruction is executed. On the other hand, if it is determined that the STN type liquid crystal display device 9 is connected to the personal computer main unit 1, the STN type liquid crystal display device display specification setting instruction is executed. Then, the remaining system boot-up instructions are executed.

In the present personal computer, the imperfect connection between the personal computer main unit 1 and the TFT type liquid crystal display device 2 or the STN type liquid crystal display device 9 can be informed to the user. Further, since the display device connection identification unit is connected to the display controller 20, the system boot-up process can be rapidly conducted.

In the present embodiment, the terminal #22 of the display controller is connected to the 31st bit of the register 39 although other bit may be used. Further, in the present embodiment, the terminal #22 is pulled up in the display controller 20 although it may be pulled up externally. In the present embodiment, the terminal #22 is pulled up and the connection pin #28 of the main unit connector 23a is grounded although they may be reversed. Further, in the present embodiment, the connection pin #27 of the main unit connector 23a is connected to the terminal #22 of the display controller 20, other terminal than the terminal #22 may be used. In the present embodiment, when it is determined that the liquid crystal display device is not connected to the personal computer main unit 1, the alarm device generates the panel non-connection alarm sound and the LCD connection identification instruction is executed again although the LCD connection identification instruction need not be executed after the generation of the panel non-connection alarm sound by the alarm device.

Figure 24A:
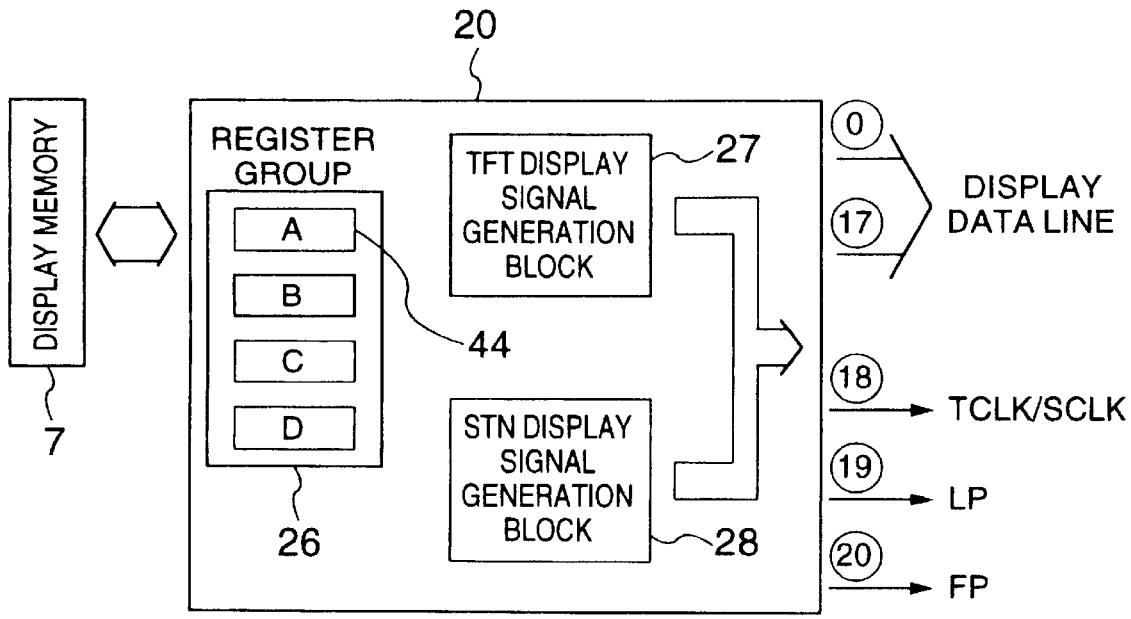
FIGS. 24A and 24B show configurations of portions of another personal computer in accordance with the present invention.
Figure 24B:
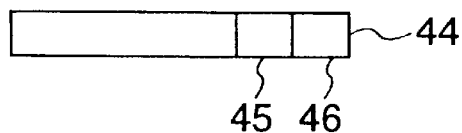
Figure 27:
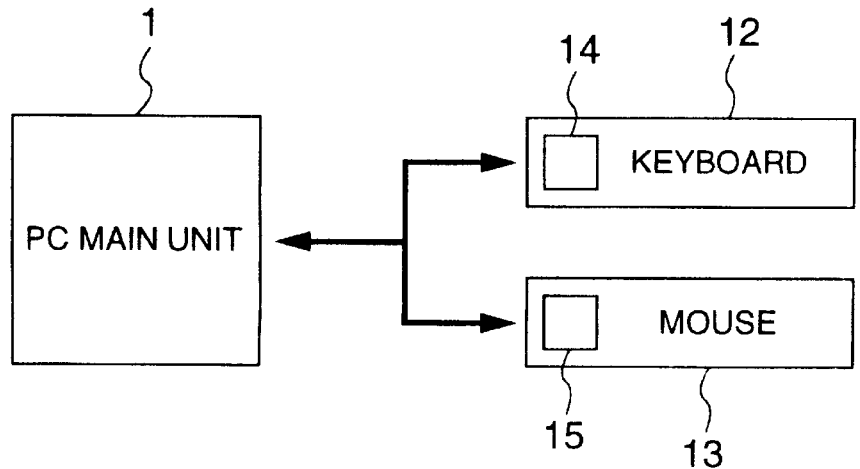
FIG. 27 shows a schematic configuration of another conventional personal computer.
Figure 25:
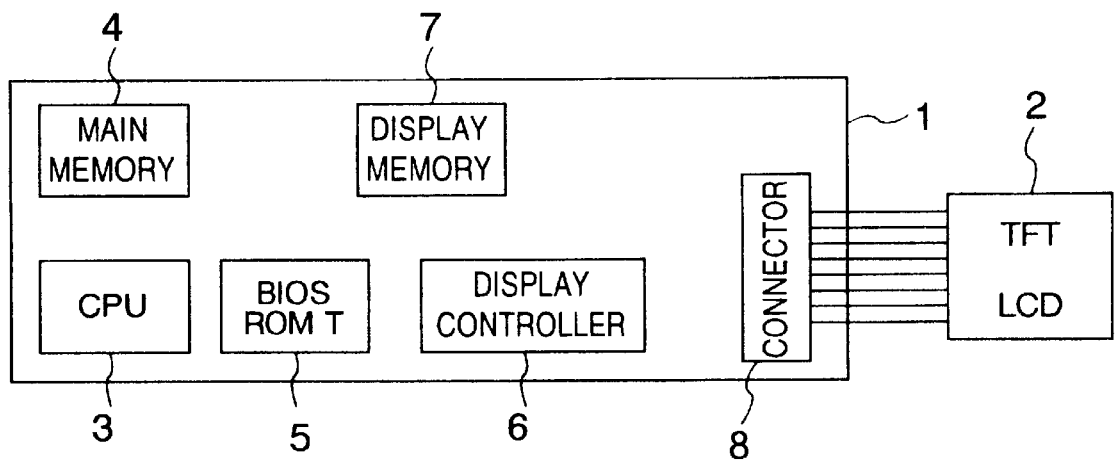
FIG. 25 shows a schematic configuration of a conventional personal computer.
Figure 26:
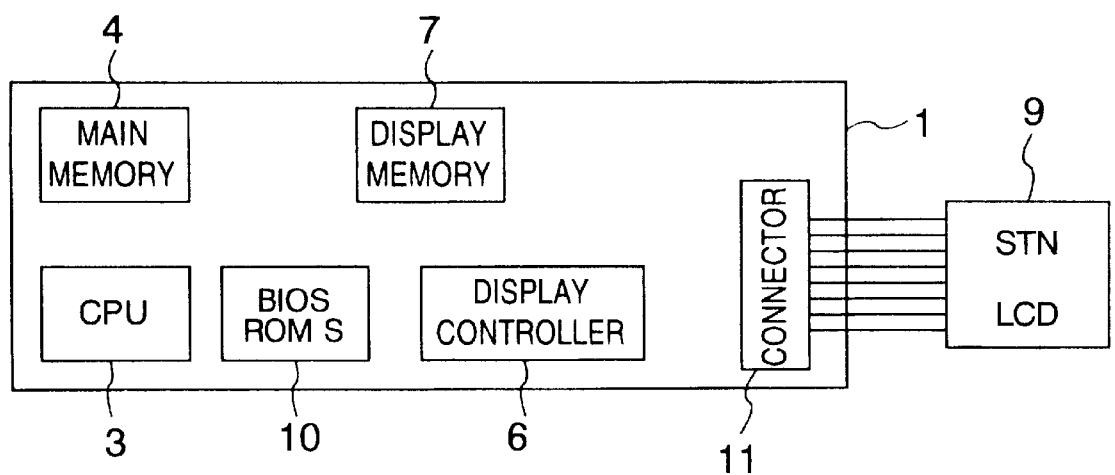
FIG. 26 shows a schematic configuration of another conventional personal computer.

FIG. 24A shows a configuration of a portion of other personal computer in accordance with the present invention and FIG. 24B shows a detail of a portion of FIG. 24A. As shown, a register 44 of a register group 26 is provided with a TFT connection bit 45 and an STN connection bit 46, and the register 44 constitutes a display device type memory unit.

In the present personal computer, when the TFT type liquid crystal display device 2 is connected to the personal computer main unit 1, "1" is written into the TFT connection bit 45, and when the STN type liquid crystal display device 9 is connected to the personal computer main unit 1, "1" is written into the STN connection bit 46. For example, after turning on the power, the data in 30- and 31-th bits of register 39 in FIG. 21 are converted in accordance with the necessity, and transferred the data to TFT connection bit 45 and STN connection bit 46, respectively. Such data conversion is made as follows. If the 31-th bit of register 39 is "1", TFT connection bit 45 and STN connection bit 46 are both set to "0". If, the 31-th bit and 30-th bit of register 39 are "0" and "1", respectively, only TFT connection bit 45 is set to "1". If the 30-th bit of register 39 is "0", only STN connection bit 46 is set to "1". In this case, the writing of "1" into both the TFT connection bit and the STN connection bit is inhibited. When the power is turned on, the CPU 19 executes the system boot-up instruction and then executes the LCD connection identification instruction. Namely, the CPU 19 reads the values of the TFT connection bit 45 and the STN connection bit 46, and if the values of the TFT connection bit 45 and the STN connection bit 46 are "0", the alarm device (not shown) generates a panel non-connection alarm sound. When the value of the TFT connection bit 45 is "1", the CPU 19 executes the TFT type liquid crystal display device display specification setting instruction. When the value of the STN connection bit 46 is "1", the CPU 19 executes the STN type liquid crystal display device display specification setting instruction.

In the above embodiments, the information processing apparatus is the personal computer although the present invention is applicable to other information processing apparatus such as a word processor or a computer network terminal. In the above embodiments, the first and second display devices are TFT type liquid crystal display device 2 and the STN type liquid crystal display device 9 although other types of display devices such as a CRT, a plasma display or an electroluminescent display may be used. Further, a large size liquid crystal display device and a small size liquid crystal display device may be used.

In accordance with the information processing apparatus of the present invention, a plurality of types of display devices may be connected to one information processing apparatus main unit.

By providing the display device type identification device to determine whether the display device connected to the information processing apparatus main unit is the first type of display device or the second type of display device, the type of the display device connected to the information processing apparatus can be automatically determined and the manufacturing work and the display device replacement work can be facilitated.

When the display device type identification device is connected to the display controller, the system boot-up can be rapidly conducted.

By providing the display device connection identification device to identify whether the first display device or the second display device is connected to the information processing apparatus, the imperfect connection between the information processing apparatus and the first display device or the second display device can be informed to the user.

Further, by connecting the display device connection identification device to the display controller, the system boot-up process can be rapidly conducted.

What is claimed is:

1. An information processing apparatus for outputting a display signal for a display device, comprising:

a display device detachable from a main unit of said information processing apparatus through coupling means, a plurality of signals being transmitted between said main unit and said display device through said coupling means;

memory means for storing a plurality of display specification setting instructions for specifying display specification of two types of display devices having different specifications from each other;

means for generating identification signals for specifying the display specifications of said display devices;

instruction execution means for reading one of the display specification setting instructions from said memory means in response to an identification signal to execute the display specification setting instruction, said instruction execution means receiving the identification signal from said identification signal generation means to specify the display specification setting instruction; and a display controller for outputting the display signal in accordance with the display specification of the display specification setting instruction, wherein said coupling means includes a second coupling device provided in the display means and connectable to a first coupling device provided in said main unit, said identification signal generation means includes a first terminal arranged on said first coupling device and having a predetermined voltage applied thereto, and a second terminal connected to a ground potential, and a plurality of pins arranged on said second coupling device and connectable to said first terminal and said second terminal and outputs one of different output voltages as the identification signal in accordance with the connection status between said plurality of pins when said first coupling device and said second coupling device are coupled.

2. An information processing apparatus according to claim 1, further comprising detection means for generating a signal indicating whether said first and second coupling devices are securely coupled or not;

said coupling detection means includes a fifth terminal arranged on said first coupling device and having a predetermined voltage applied thereto, a sixth terminal connected to a ground potential and a third terminal and a fourth terminal arranged on said second coupling device for coupling said fifth terminal and said sixth terminal and outputs the coupling signal when said fifth terminal and said third terminal are contacted and said sixth terminal and said fourth terminal are contacted.

3. An information processing apparatus according to claim 2, further comprising means for generating an alarm signal when the contact is not detected between said fifth terminal and said third terminal or between said sixth terminal and said fourth terminal.

4. An information processing apparatus according to claim 1, wherein said display controller includes a register for holding the voltage output from said identification signal generation means, and said instruction execution means includes means for reading the voltage signal from said register.

5. An information processing apparatus according to claim 3, wherein said display controller includes a register for holding the identification signal from said identification signal generation means and the coupling signal from said coupling detection means, and said instruction execution means includes means for reading said signals held in said register.

6. An information processing apparatus for outputting a display signal for a display device, comprising:

memory means for storing a plurality of display specification setting instructions for specifying display specification of a plurality of display devices having different specifications from each other;

instruction execution means for reading one of the display specification setting instructions from said memory means in response to an identification signal to execute the display specification setting instruction;

a display controller for outputting the display signal in accordance with the display specification of the display specification setting instruction;

a display device removably mounted on a main body of said information processing apparatus with coupling means;

said coupling means provided with a plurality of pins for transmitting a plurality of signals between said main body and said display device, said plurality of pins having a specific pin connection corresponding to the respective display devices, said specific pin connection including pins connected to each other with conductors and/or pins not connected to each other and providing information representing display specification;

said coupling means further including means, in said main body, for generating identification signals in accordance with said pin connection of the coupling means of said display device when said display device is mounted on said main body with said coupling means; and said instruction execution means receiving the identification signal from said means for generating identification signals to specify the display specification setting instruction of said display device mounted on said main body, wherein said coupling means includes a second coupling device provided in the display means and connectable to a first coupling device provided in said main body, said identification signal generation means includes a first terminal arranged on said first coupling device and having a predetermined voltage applied thereto, and a second terminal connected to a ground potential, and a plurality of pins arranged on said second coupling device and connectable to said first terminal and said second terminal and outputs one of different output voltages as the identification signal in accordance with the connection status between said plurality of pins when said first coupling device and said second coupling device are coupled.

7. An information processing apparatus according to claim 6, further comprising detection means for generating a signal indicating whether said first and second coupling devices are securely coupled or not;

said coupling detection means includes a fifth terminal arranged on said first coupling device and having a predetermined voltage applied thereto, a sixth terminal connected to a ground potential and a third terminal and a fourth terminal arranged on said second coupling device for coupling said fifth terminal and said sixth terminal and outputs the coupling signal when said fifth terminal and said third terminal are contacted and said sixth terminal and said fourth terminal are contacted.

8. An information processing apparatus according to claim 7, further comprising means for generating an alarm signal when the contact is not detected between said fifth terminal and said third terminal or between said sixth terminal and said fourth terminal.

9. An information processing apparatus according to claim 6, wherein said display controller includes a register for holding the voltage output from said identification signal generation means, and said instruction execution means includes means for reading the voltage signal from said register.

10. An information processing apparatus according to claim 8, wherein said display controller includes a register for holding the identification signal from said identification signal generation means and the coupling signal from said coupling detection means, and said instruction execution means includes means for reading said signals held in said register.

* * * * *